UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF MAKING ACETYL-CELLULOSE PLASTIC COMPOUNDS.

1,203,756.     Specification of Letters Patent.     Patented Nov. 7, 1916.

No Drawing. Original application filed May 23, 1912, Serial No. 699,235. Divided and this application filed June 8, 1915. Serial No. 32,862.

*To all whom it may concern:*

Be it known that I, WILLIAM G. LINDSAY, a citizen of the United States, residing at Caldwell, in the county of Essex and State of New Jersey, have invented certain new and useful Improvements in Processes of Making Acetyl-Cellulose Plastic Compounds, of which the following is a specification.

The various compositions to which the present invention relates are employed in the arts, sometimes as imitations of natural substances and sometimes as films which are used for photographic purposes. Although the final or useful form of the different compounds of acetyl cellulose is that of a solid or dry material, the different processes of conversion into this final solid form involve, as is well understood, the employment of solutions or mixtures of varying consistencies as to elasticity, stiffness or fluidity, depending generally upon the proportion or kind of solvent used to the amount of the original base—acetyl cellulose.

In the treatment of acetyl cellulose for the production of solutions for the manufacture of lacquers, varnishes, photographic films, and flexible or plastic compounds, I have discovered that a mixture of ethyl acetate and methyl alcohol constitutes a solvent of that variety of acetyl cellulose which is freely soluble in acetone.

It is well known that ethyl acetate or acetic ether has been proposed as a solvent for the acetone-soluble variety of acetyl cellulose and that the ethyl acetate found on the market contains varying amounts of ethyl alcohol. I have discovered, however, that when the commercial or the 100% ethyl acetate is diluted with methyl alcohol in certain proportions, the mixture exerts an increased solvent action on the acetyl cellulose of the variety described for the preparation of acetyl cellulose plastics.

The best proportions I have found are 30% to 40% of methyl alcohol mixed with 60% to 70% of ethyl acetate, and one example of practising my invention is as follows: To 100 parts, by weight, of the acetone-soluble variety of acetyl cellulose, I add 10 to 20 parts, by weight, of paraethyltoluolsulfonamid and 20 to 30 parts of triphenyl phosphate. I incorporate these solid ingredients thoroughly by mechanical stirring and add to the mixture thus obtained from 60 to 70 parts, by weight, of a mixture composed of 70 parts, by volume, of ethyl acetate and 30 parts, by volume, of methyl alcohol. The mass is then thoroughly incorporated by suitable malaxating or kneading and when a uniform mixture is obtained the excess of solvent is allowed to evaporate and the dough-like product thus obtained is further worked up according to the method which is well known in the manufacture of nitro-cellulose-camphor compounds.

Having thus described my invention, what I claim is:

1. The process of making acetyl cellulose plastic compounds from that variety of acetyl cellulose which is freely soluble in acetone which consists in mixing paraethyltoluolsulfonamid with the acetyl cellulose; adding a mixture of ethyl acetate and methyl alcohol; allowing the excess of solvent to evaporate; working the mass on rolls or in presses with the application of heat, substantially as set forth.

2. The process of making acetyl cellulose plastic compounds from that variety of acetyl cellulose which is freely soluble in acetone that consists in mixing paraethyltoluolsulfonamid with triphenyl-phosphate and acetyl cellulose; adding a mixture of ethyl acetate and methyl alcohol; allowing the excess of solvent to evaporate; working the mass on rolls or in presses with the application of heat, substantially as set forth.

3. The process of making acetyl cellulose plastic compounds which consists in treating that variety of acetyl cellulose which is freely soluble in acetone with ethyl acetate in admixture with methyl alcohol substantially in the proportions described and with paraethyltoluolsulfonamid; and manipulating the mass.

4. The process of making acetyl cellulose plastic compounds which consists in treating that variety of acetyl cellulose which is freely soluble in acetone with ethyl acetate in admixture with methyl alcohol substantially in the proportions described and with paraethyltoluolsulfonamid and triphenyl-phosphate; and manipulating the mass.

In testimony whereof I affix my signature.

WILLIAM G. LINDSAY.